United States Patent
Tsai

(10) Patent No.: US 9,013,408 B2
(45) Date of Patent: Apr. 21, 2015

(54) GAME CONTROLLER WITH CLICKABLE TRACKBALL

(75) Inventor: Sian-Chin Tsai, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 547 days.

(21) Appl. No.: 12/667,360

(22) PCT Filed: Jul. 2, 2007

(86) PCT No.: PCT/US2007/015352
§ 371 (c)(1),
(2), (4) Date: Dec. 30, 2009

(87) PCT Pub. No.: WO2009/005500
PCT Pub. Date: Jan. 8, 2009

(65) Prior Publication Data
US 2010/0184514 A1     Jul. 22, 2010

(51) Int. Cl.
*G09G 5/08*     (2006.01)
*A63F 13/20*    (2014.01)

(52) U.S. Cl.
CPC ......... *A63F 13/06* (2013.01); *A63F 2300/1006* (2013.01)

(58) Field of Classification Search
CPC .............. G06F 3/03549; G06F 3/0362; G06F 3/03543; G06F 3/03544; G06F 3/0312

USPC ........... 345/156, 160–162, 167, 169; 463/30, 463/36–38, 43, 47, 46
See application file for complete search history.

(56) References Cited

U.S. PATENT DOCUMENTS

| | | | | |
|---|---|---|---|---|
| 4,562,347 A * | 12/1985 | Hovey et al. | ................. | 250/221 |
| 5,457,479 A * | 10/1995 | Cheng | ............................ | 345/163 |
| 5,619,251 A * | 4/1997 | Kuroiwa et al. | ............... | 725/133 |
| 7,006,074 B2 * | 2/2006 | Chesters | ........................ | 345/156 |
| 7,508,377 B2 * | 3/2009 | Pihlaja et al. | ................. | 345/161 |
| 2005/0156891 A1 * | 7/2005 | Heide et al. | ................... | 345/167 |
| 2005/0219216 A1 * | 10/2005 | Yoshikawa | ..................... | 345/167 |
| 2006/0025217 A1 * | 2/2006 | Hussaini et al. | ................. | 463/36 |
| 2007/0018946 A1 * | 1/2007 | Manley et al. | ................ | 345/156 |
| 2007/0216650 A1 * | 9/2007 | Frohlich et al. | ............... | 345/167 |
| 2008/0128596 A1 * | 6/2008 | Liu et al. | ....................... | 250/221 |

* cited by examiner

*Primary Examiner* — Jennifer Nguyen
(74) *Attorney, Agent, or Firm* — Novak Druce Connolly Bove + Quigg LLP

(57) ABSTRACT

An improved user input device is disclosed whereby the device is equipped with a trackball in addition to other control devices, such as an analog stick controller (e.g., thumbstick or joystick). The trackball is mounted in such a way that it projects both upwardly and downwardly from the device body in the vertical plane. The user is able to touch and use the trackball from both the upper and lower directions. In a preferred embodiment, the trackball is clickable, affording greater control and ease of use.

19 Claims, 3 Drawing Sheets

GAME CONTROLLER WITH CLICKABLE TRACKBALL

FIELD OF THE INVENTION

The present invention relates generally to the field of computer peripherals, and more particularly to user input devices such as gamepad game controllers.

BACKGROUND OF THE INVENTION

Current controllers for game console machines come in many configurations. The most typical is that popularized by the Sony Playstation™, Microsoft Xbox™, Nintendo™ and other related game systems, i.e., the gamepad. In this configuration, the user holds the game controller with two hands, and manipulates the controls with his thumbs and fingers. These controllers are designed to fit as wide a segment of their target audience as possible.

An exemplary prior art gamepad is shown in FIG. 1. Referring to FIG. 1, the controller segments are shown as: body; arms; and thumb modules. The arms contain various buttons, joysticks, mushrooms or the like.

Games known as "first person shooter" or "FPS" games (games where the player takes the character's viewpoint in a virtual, three-dimensional world, hence "first person"), are typically played on the PC using a combination of a mouse and keyboard. The keyboard is typically used to control the character's displacement in the 3-D world (e.g., "WASD" control, whereby pressing "W" on the keyboard moves the player forward, "A" left, "S" back and "D" right) while the mouse is used to control the character's viewpoint (e.g., moving the mouse to the left and right will rotate his viewpoint left and right, moving the mouse up and down is akin to looking upwards and downwards).

These FPS games (and others) now require a high degree of sophistication that require fine control over the character's view point in order to track (and hence, fire game weapons at and hit) fast moving or "distant" targets in the virtual 3D world. A mouse is ideal for this purpose because it affords a high degree of control to the player. The player moves X distance and his view point correspondingly changes X degrees and stays at this angle until the mouse is moved again.

Console controllers however, typically do not incorporate any device that replicates a mouse in terms of degree of control. The left analog stick, or equivalent digital device, replicates the "WASD" function of the keyboard, and the right analog stick or equivalent digital device controls the viewpoint. However, the right analog stick in this case does not act like the mouse in the previous example. While the player pushes the stick in the desired direction, the character's viewpoint moves in that direction until the player returns the stick to a "neutral" position, at which point the character stops turning. The rate of turn is determined by how much actuation the player puts on the stick (i.e. how "far" he pushes the stick in the desired direction). There is therefore a rather low maximum speed limit at which a turn can be induced, which is problematic for the character if there is a virtual enemy behind him.

This is also a problem for accuracy, since analog sticks are typically more difficult to manipulate than a mouse to get a precise viewpoint. For example, assume "User A" is using a mouse and keyboard. If User A's mouse is configured so that 1 degree of viewpoint change is achieved by 1 mm of movement, User A must "look" directly at and shoot at a target. To User A's point of view that target is exactly 30 degrees to the right and 10 degrees up from his current point of view. If User A moves his mouse 30 mm to the right and 10 mm up, he knows he will be facing his target with a high degree of consistency. He can undertake this motion as quickly or as slowly as he wishes (assuming the mouse itself has no physical limitations). In effect, substantially instantaneously, he can face his target and shoot at it if his reflexes allow.

"User B," by way of comparison, is using a console controller, with two joysticks controlled by her thumbs. Let us assume that her right analog "thumbstick" controls the character's view point. Her thumbstick has 5 levels of displacement. At level 1, the smallest level of displacement, a turn is configured at 1 degree per second. At level 2 it is 2 degrees per second and so and so forth until level 5, which is 5 degrees per second. She too must hit a target exactly 30 degrees to the right and 10 degrees up. For User B to hit his target, she can move her thumbstick to the right to displacement level 5 for 6 seconds and up at displacement level 5 for 2 seconds in turn. If she wished to do both at once, she would be faced with the limitation that she would somehow need to stop the upwards motion precisely at the 2 second mark otherwise he would overshoot his target. She also is limited by the maximum rate of turn of this control method.

As can be seen, the control method of User B is not as efficient or precise as the control method of User A. The problem is that for the sake of compactness of the controller, and where a flat surface is not always available (e.g., in the case of a living room where the game is played in the context of a television and a sofa) for a mouse, using a mouse and keyboard may not always be possible or desired.

Certain prior art game controllers allow the analog joysticks to be "clicked" or actuated when pressed downward. As the trackball can replace or supplement the function of at least one of the analog joysticks, a preferred embodiment of the present invention represents an improvement to the idea of having a trackball in a game controller by giving it similar functionality to the analog joystick which it replaces.

Other prior art devices, such as those shown in U.S. Pat. No. 6,809,722 and U.S. Publication No. 2005/0156891, disclose the use of a trackball that is accessible from multiple directions. They essentially describe device held in one hand, with a trackball on one end. They fail to disclose, however, an integrated trackball/controller combination as described herein.

Thus, it is an object of the present invention to provide a game controller that is ergonomic, convenient and powerful. In some embodiments, the game controller requires less movement of the fingers to actuate a button if the trackball is clickable, resulting in less strain and deleterious effects to the wrist, hand and fingers.

SUMMARY OF THE INVENTION

An improved user input device is disclosed that, in various embodiments, enhances control, is ergonomic, integrated and compact.

A trackball is a pointing device consisting of a ball housed in a socket containing sensors to detect rotation of the ball about two axes. The user rolls the ball with the thumb, fingers, or the palm of the hand. Trackballs are now available with optical tracking which follows geometric patterns on the ball. Some use LEDs to illuminate the surface that is being tracked. Changes between one frame and the next are processed by the image processing part of the chip and translated into movement on the two axes using an optical flow estimation algorithm.

A user input device such as a game pad is equipped with a trackball in addition to other control devices, such as an analog joystick, thumbstick or d-pad. The trackball is mounted in such a way that it projects both upwardly and downwardly from the device body in the vertical plane. Consequently, the user is able to touch and use them from both the upper and lower directions.

In a preferred embodiment, the trackball is clickable, and the clicking of the trackball may be used to provide yet greater user control, as described below.

BRIEF DESCRIPTION OF THE DRAWINGS

The foregoing and other advantages of the invention will become apparent upon reading the following detailed description and upon reference to the drawings, wherein.

Figure 1:
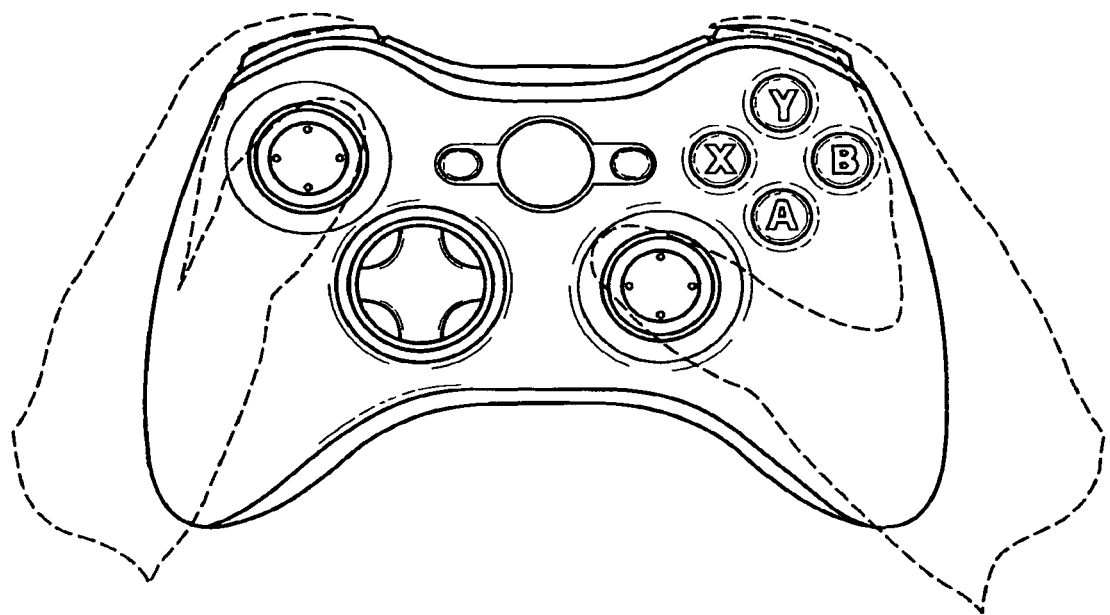
FIG. 1 is a top-down view of a prior art game controller.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As summarized above, embodiments of the invention provide a computer input device such as a gamepad having advantageous control and ergonomic benefits. With the invention, a user can enjoy the benefits and advantages of a joystick-type controller and an integrated trackball.

Figure 2:
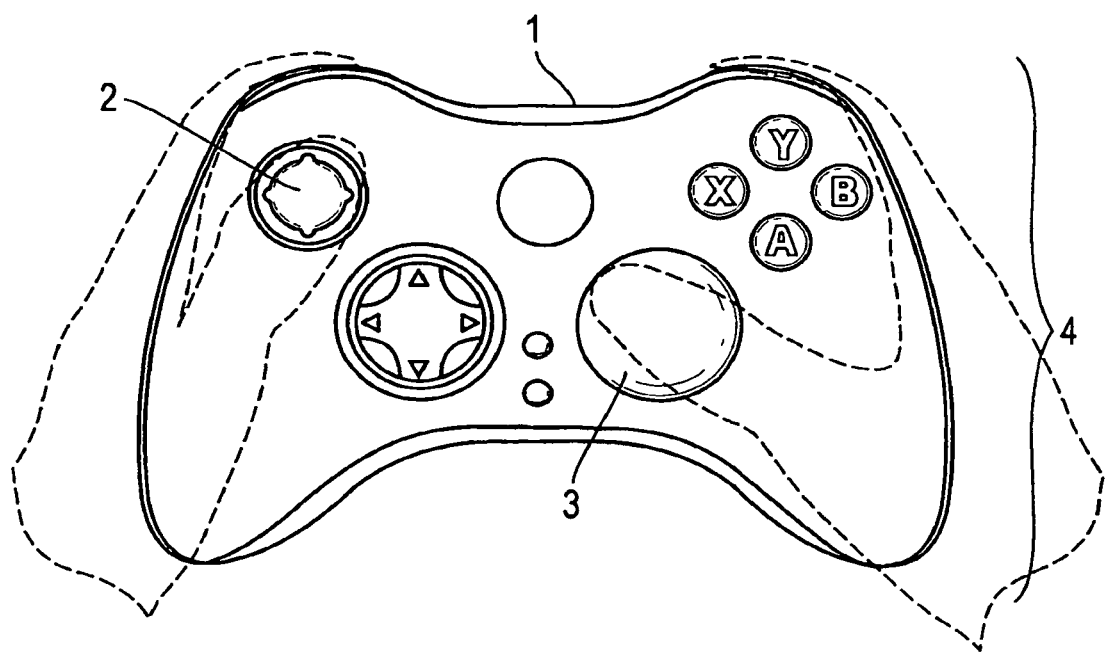
FIG. 2 illustrates a top-down view of a game controller having an integrated track ball in accordance with one aspect of the present invention.

FIG. 2 demonstrates a principal embodiment of the invention. A controller 1 integrates a conventional thumbstick 2 and a trackball 3. For example, when playing an FPS game, a character's displacement may be controlled via the left thumbstick, and viewpoint is controlled by a right trackball. As will be readily understood by a person of skill in the art, however, other possible permutations pertaining to using a trackball fall within the scope of the invention (e.g., left trackball, right thumbstick/right trackball, left digital pad or digital buttons, etc.).

Figure 3:
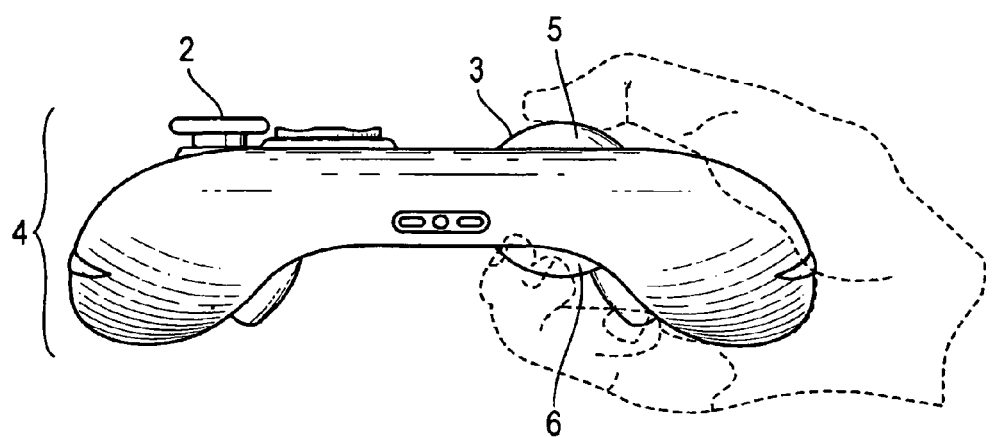
FIG. 3 illustrates a side view of a game controller having an integrated track ball in accordance with one aspect of the present invention.

FIG. 3 illustrates a side view of the embodiment shown in FIG. 2. As shown in FIG. 3, an ergonomic design in a game controller meant to be held in one or both hands, independent of any supporting surface, where the trackball 3 can be manipulated from both the top and bottom of the controller while still using the hand to support the controller. Referring to FIG. 3, the trackball 3 may be accessed from above (in the example shown, by the thumb of the right hand of user 4) or below (typically by the fingers of the right hand of user 4). This provides flexibility to the user's preference to use either or both of these options when desired. This assists greatly in fine degree control as well as speed, since a user in this case can use three or more fingers to rapidly manipulate the trackball 3 while still maintaining a firm grip on the controller (as well as possibly using his fingers to actuate other buttons). A user in this case may be able to more rapidly turn the ball than if just using the thumb, and he will also be able to exercise greater fine degree control by using his fingers and thumb to arrest, brake or reverse the trackball motion as needed.

The trackball 3 can thus approximate the typical FPS function of the mouse in a PC environment. If a user 4 moves a trackball 3 a specific distance, for example, the character's point of view can change the specific corresponding degree. This approach thus resolves issues of accuracy associated with joystick-type controllers, while maintaining compactness and integration in a single handheld controller.

The system and method also encompasses devices that may cause the trackball 3 to emulate the function of an analog/digital stick (which would be desirable to maintain compatibility with games only designed to operate with the older method of controlling viewpoint), since this ergonomic design and use of a trackball still provides advantages over a two analog/digital joystick configuration, although the benefit would not be as great as described above.

Figure 4:
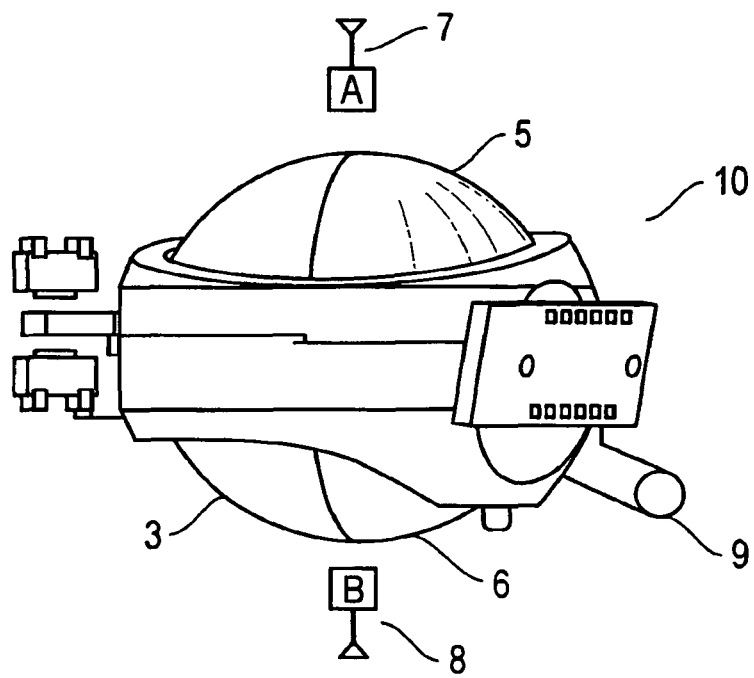
FIG. 4 illustrates a side view of a clickable trackball and associated coupling and hinges in accordance with an alternative embodiment of the present invention.

In an alternative embodiment depicted in FIG. 4, the middle section of the trackball can be attached to the game controller through an assembly of coupling and hinge assembly 10, providing the ability to "click" the trackball much like a computer mouse button. The trackball 3 is exposed on both the upper 5 and lower 6 surfaces so that it can be manipulated by the user 4 with fingers either above or below the game controller, in the downward 7 and upward 8 directions, respectively. Within the controller itself, there are optical/laser tracking sensors to monitor the movement of the trackball 3. The clicking mechanism will be discussed in connection with FIG. 5.

Figure 5:
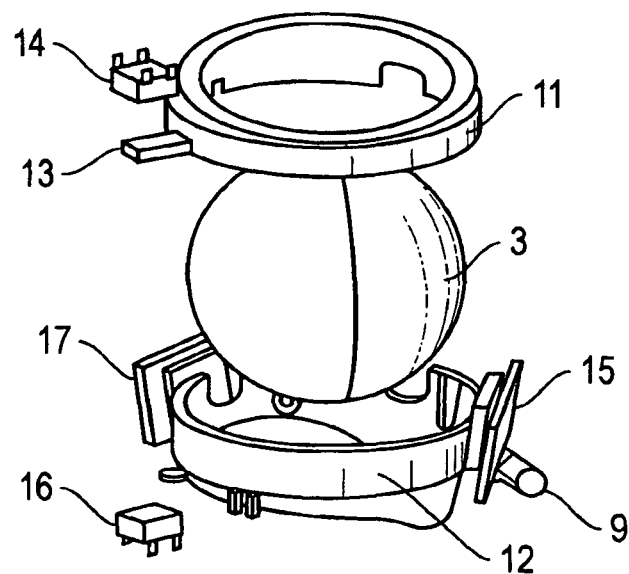
FIG. 5 represents an exploded view of the clickable trackball and associated coupling and hinges shown in FIG. 4.

As shown in FIG. 5, the coupling and hinge assembly 9 can be comprised of upper 11 and lower 12 subassemblies. Upper subassembly 11 comprises actuator 13 and upper tact switch 14. Lower/bottom subassembly 12 comprises optical/laser tracking systems 15, 17 and a lower tact switch 16. So mounted, the trackball 3 can be actuated by pressing or clicking it downwards (when the fingers are placed on top) and/or by pressing or clicking upwards (when the fingers are placed below). The actuation of the trackball clicking can be detected by at least one tact switch (14, 16) within the controller and in contact with the trackball 3. These tact switches (14, 16) are able to detect the movement of the trackball 3 or specifically, the clicking action of the trackball 3, from both directions (upwards and downwards) and send a signal to the game or game console to perform certain prescribed functions.

In a preferred embodiment, the trackball 3 may also be actuated by pressing on it (either upwards 8 or downwards 7) more than one time quickly in succession (e.g., a double-clicking action), which may actuate, for example, a different command in the game or game console.

Note that aspects of the above invention can be beneficially applied to other user input devices, including rumble pads, control pads and joypads. Thus, while the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A computer controller comprising:
a device body; and
a trackball for providing a first signal and a second signal, said trackball having upper, middle and lower portions, said trackball rotatably mounted to said device body with a coupling assembly in contact with said middle portion of said trackball, said coupling assembly comprising an upper subassembly and a lower subassembly;

wherein the first signal is provided by a tracking system communicatively coupled to said lower subassembly;

wherein said first signal is enabled upon selective rotation of one of said upper and lower portions of said trackball:

wherein said second signal is provided by one of a first switch situated at the upper subassembly and a second switch located at the lower subassembly; and wherein said second signal is enabled upon a depression of one of said upper and lower portions of said trackball.

2. The computer controller of claim 1, wherein said first switch and said second switch is a tact switch communicatively coupled to said trackball, whereby said tact switch is activated upon the depression of one of said upper and lower portions of the trackball.

3. The computer controller of claim 1, wherein said computer controller is a gamepad.

4. The computer controller of claim 1, further comprising a stick controller located on a left side of said device body, wherein said trackball is located on a right side of said device body.

5. The computer controller of claim 4, wherein said stick controller is a joystick.

6. The computer controller of claim 4, wherein said stick controller is a thumbstick.

7. The computer controller of claim 1, wherein said tracking system comprises a laser optical tracking system and an optical tracking system.

8. The computer controller of claim 1, wherein said coupling assembly further comprises an actuator.

9. The computer controller of claim 1, wherein said computer controller is
a d-pad.

10. A computer controller comprising:
a device body: and
a clickable trackball for providing a first signal and a second signal, said trackball having upper, middle and lower portions, said trackball rotatably mounted to said device body with a coupling assembly in contact with said middle portion of said trackball, thereby leaving said upper and lower portions exposed for selective rotation by a user, said coupling assembly comprising an upper subassembly and a lower subassembly;

wherein said first signal is provided by a tracking system communicatively coupled to said lower subassembly;

wherein said first signal is enabled upon selective rotation of one of said upper and lower portions of the trackball;

wherein said second signal is provided by one of a first switch situated at the upper subassembly and a second switch located at the lower subassembly;

wherein said second signal is enabled upon a depression of one of said upper and lower portions of the trackball; and wherein said upper and lower portions of the trackball are independently operable from each other.

11. The computer controller of claim 10, wherein said trackball emulates a digital and analog stick.

12. The computer controller of claim 10, wherein said tracking system comprises two optical tracking systems.

13. The computer controller of claim 10, wherein said first switch and said second switch comprises a tact switch communicatively coupled to said trackball, whereby said tact switch is activated upon the depression of one of said upper and lower portions of the trackball.

14. The computer controller of claim 10, wherein said computer controller is a gamepad.

15. The computer controller of claim 10 further comprising a joystick.

16. The computer controller of claim 15, wherein said joystick is located on a left side of said device body, and said trackball is located on a right side of said device body.

17. The computer controller of claim 10, further comprising a thumbstick.

18. The computer controller of claim 12, wherein said computer controller is a d-pad.

19. The computer controller of claim 10, wherein said tracking system is a laser tracking system.

* * * * *